United States Patent
Shaikh et al.

(10) Patent No.: US 6,446,697 B1
(45) Date of Patent: Sep. 10, 2002

(54) RAPIDLY MAKING COMPLEX CASTINGS

(75) Inventors: Furqan Zafar Shaikh, Troy; Martin Andrew Brogley, Allen Park; Craig Edward Burch, West Bloomfield; Neal James Corey, Belleville; Thomas John Heater, Milford; Gary Allan Vrsek, Brighton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 1115 days.

(21) Appl. No.: 08/874,812

(22) Filed: Jun. 13, 1997

Related U.S. Application Data

(63) Continuation-in-part of application No. 08/158,879, filed on Nov. 29, 1993, now abandoned.

(51) Int. Cl.⁷ .............................. B22C 7/02; B22C 9/04
(52) U.S. Cl. .............................. 164/4.1; 164/35; 164/45
(58) Field of Search .......................... 164/4.1, 34, 35, 164/45, 516

(56) References Cited

U.S. PATENT DOCUMENTS

| | | | |
|---|---|---|---|
| 3,461,749 A | 8/1969 | Gagne | 164/34 |
| 3,512,571 A | 5/1970 | Phelps | |
| 3,835,913 A | 9/1974 | Vandemark et al. | |
| 4,066,116 A | 1/1978 | Blazek | |
| 4,518,288 A | 5/1985 | Cilindro | |
| 4,632,169 A | 12/1986 | Osborn et al. | |
| 4,651,798 A | 3/1987 | Rikker | 164/45 |
| 4,728,258 A | 3/1988 | Blazek et al. | |
| 4,987,944 A | 1/1991 | Parks | |
| 5,054,537 A | 10/1991 | Van Ross | |
| 5,072,782 A | 12/1991 | Namba | 164/45 |
| 5,088,545 A | 2/1992 | Corbett | |
| 5,111,869 A | 5/1992 | Corbett et al. | |
| 5,119,882 A | 6/1992 | Corbett | |
| 5,197,527 A | 3/1993 | Namba et al. | |

FOREIGN PATENT DOCUMENTS

| | | |
|---|---|---|
| DE | 32 40 005 A1 | 5/1983 |
| EP | A-0502580 | 9/1992 |
| FR | 2615425 | 11/1988 |
| GB | A-2150875 | 7/1985 |
| JP | 61-129253 | 6/1986 |
| JP | 61-47620 | 10/1986 |
| JP | 64-34541 | 2/1989 |
| JP | 1-157740 | 6/1989 |
| JP | 1-178340 | 7/1989 |
| JP | 1-178341 | 7/1989 |
| JP | 1-178343 | 7/1989 |
| JP | 3-216237 | 9/1991 |
| JP | 4-4944 | 1/1992 |
| JP | 4-266446 | 9/1992 |

*Primary Examiner*—Kuang Y. Lin
(74) *Attorney, Agent, or Firm*—Joseph W. Malleck

(57) ABSTRACT

Method of rapidly making casting, comprising: designing a computer graphic model of the casting; sectioning the graphic model into graphic members which are at least one of blocks and slabs; carving a solid member for each of the graphic members, the solid members being (i) constituted of a meltable or evaporative solid material (i.e. wax or polystyrene), (ii) proportional to and enveloping its corresponding graphic member, and the carving being carried out by accessing two or more sides of each solid member to at least essentially duplicate the corresponding graphic member; forming a mold around the pattern, and casting metal within the mold while removing the pattern from such mold either by evaporation during pouring of the molten metal thereinto or by melting prior thereto.

6 Claims, 11 Drawing Sheets

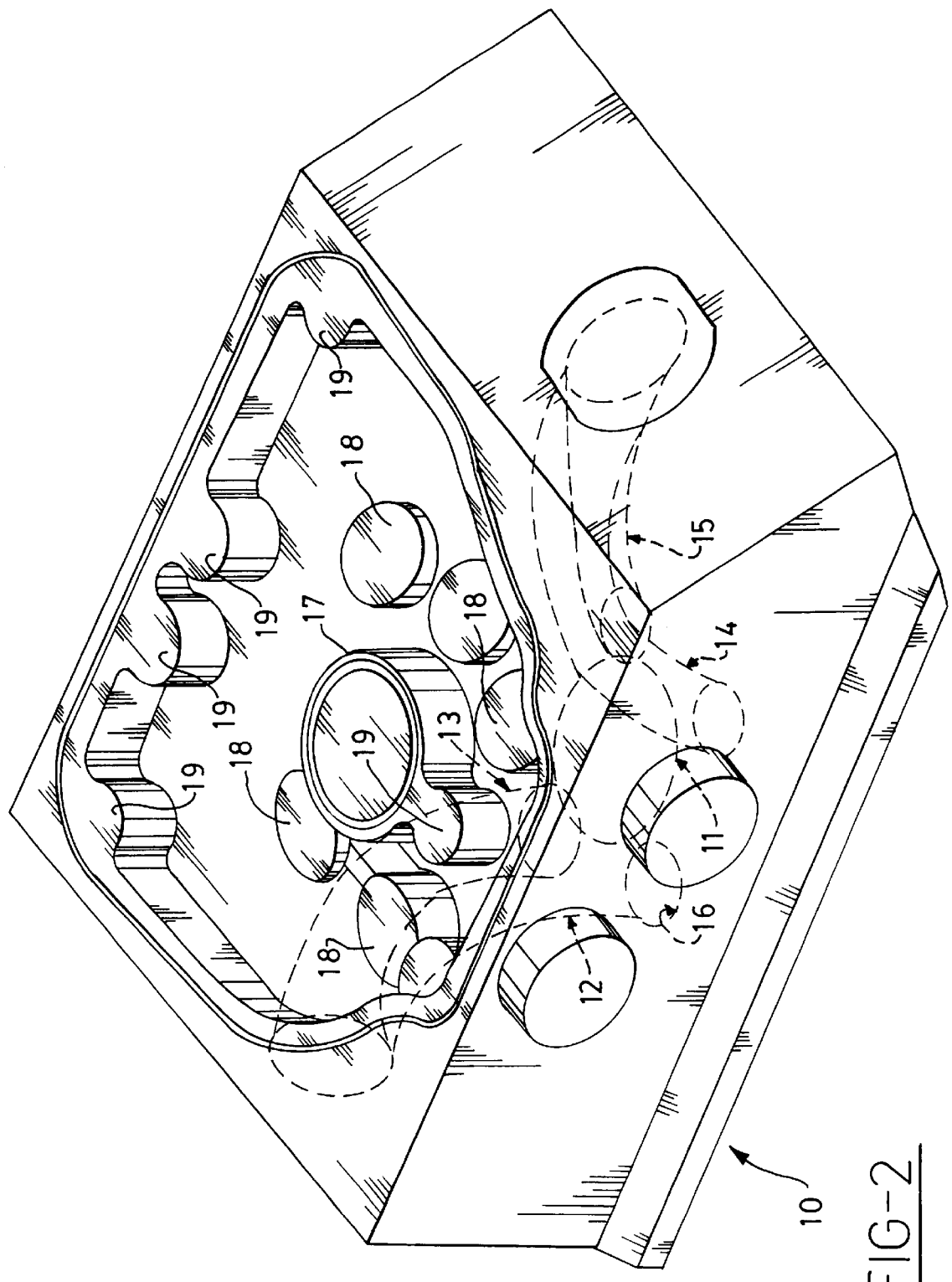

COMBINATION OF SLICES

RAPIDLY MAKING COMPLEX CASTINGS

RELATED APPLICATIONS

This in a Continuation-in-Part application of U.S. Ser. No. 08/158,879 entitled "Rapidly Making Complex Castings" filed Nov. 29, 1993 now abandoned.

BACKGROUND OF THE INVENTION

1. Technical Field

This invention relates generally to manufacturing and shaping of parts constituted of reasonably rigid material, and more particularly to rapid pattern formations by sectioned object machining which facilitates casting of such pattern.

2. Discussion of the Prior Art

It is becoming paramount that casting patterns and their associated tools be fabricate faster in free-form, at lower cost, have superior surface finish and require little or no remachining. Although there is no technology that is directed solely to rapid making of consumable patterns the technology that is relevant to these objectives fall into generally four categories: extruding, spraying, curing and laminate forming. Each has significant disadvantages that fail to meet all of the objectives.

Extrusion uses a heated nozzle to extrude hot wax or other polymer filaments, such as nylon, into a shape. It is limited to patterning of simple shapes; it is fragile, subject to delamination, and is expensive.

Spraying can be either (i) an emulsion type where a binder is sprayed onto a metal powder which is subsequently laser sintered, or (ii) thermally sprayed at Spraying is expensive, slow and produces a mediocre surface finish which is porous.

Curing, oftentimes referred to as sterolitography, involves subjecting photo-sensitive polymer resins in thin layers to a laser beam for curing and thence repeating such steps to build up a part or pattern. It is generally slow, useful only for nonmetals and tooling, and requires expensive emission control measures because of the odorous materials. It also demands post machining because the surface is not stable during storage, is somewhat brittle, and is size limited.

Prior art laminate forming involves cutting of metal plies, paper, plastic sheets or foam, by use of a laser beam, hot wire or mechanical cutter to make sheet like cutouts; the cutouts are subsequently assembled to form a unit. Laminate forming first was carried out without a computer graphic guide, the cutter following a mechanical guide. More recently, the prior art has programmed the cutter to follow a computer model or graphic, such as shown in U.S. Pat. No. 4,675,825. The latter type of laminate forming has been used to shape metal but fails to eliminate post-machining of the unit, lacks high structural integrity because of the need to use very thin laminates, is incapable of making complex parts such as intricate engine cylinder heads, manifolds or engine blocks, and is slow due to the high number of handling and finishing operations resulting from the number of laminates.

The requirement of post-machining for state of the art laminate forming is a significant drawback. Machining used for this process works only to cut edges of the thin plies or sheet metal (up to 12 mm) inhibiting full contour machining. When the sheets are assembled, the total surface will be somewhat ragged or stepped, requiring post-machining to obtain acceptable surface finishing. If the laminates are foam, paper or plastic, the same problem remains because of the inability to fully free-form the edges of the material; moreover, foam materials can produce a high degree of porosity in the final surface when assembled.

SUMMARY OF THE INVENTION

It is an object of this invention to rapidly make a consumable pattern by a more economical sectioned-object machining technique adaptable to the most complex shape, such pattern being used to form a mold therearound and thence displaced by metal. The method results in a cast product that has a surface finish that is superior, the method having little or no disadvantageous manufacturing side effects.

The invention, in a first aspect, is a method that comprises: (a) designing a three-dimensional fully surfaced computer graphic model of the part; (b) sectioning the graphic model into graphic members which are at least one of blocks and slabs; (c) carving a solid fugitive member for each graphic member that is proportional to and envelopes such graphic member, said carving being carried out by accessing two or more sides of such solid fugitive member to at least essentially duplicate the corresponding graphic member; and (d) securing the carved solid members together to replicate the graphic model as a usable unitary fugitive pattern.

The invention in a second aspect is a method of rapidly making casting comprising: (a) designing a three-dimensional fully surfaced computer graphic model of the casting including complex free-form undercut or substantially hidden interior surfaces; (b) within a computer, subdividing the graphic model into graphic members selected from blocks and slabs; (c) carving a solid non-graphic physical member to replicate each of the graphic members, the physical members being (i) constituted of a meltable or evaporative solid material (i.e. wax or polystyrene), (ii) proportional to and enveloping its corresponding graphic member, and said carving being carried out to at least access, carve into and penetrate two or more sides of each solid physical member to permit such carving to essentially duplicate the corresponding graphic member including all of the interior surfaces; (d) securing the carved solid members together to replicate the graphic model and form a unitary investment pattern; (e) forming a mold around the pattern, and (f) casting metal within the mold while removing the pattern from such mold either during pouring of the molten casting material thereinto or prior thereto by dissolution or melting.

Carving is preferably carried out on opposite sides of each member, such as by CNC milling machines, the thickness of the solid members being in the range of 14–150 mm and each of the solid members having opposed sides which are parallel or skewed with respect to each other.

The methods are capable of being applied to the making of unique machined metal functional parts, to the making of rapid developmental prototypes of cast metal parts, and to the rapid making of initial or preproduction cast components.

BRIEF DESCRIPTION OF THE DRAWINGS

FIG. 2 is a perspective view of a computer graphic model of an engine head design having a single cylinder;

DETAILED DESCRIPTION AND BEST MODE

The method of this invention machines a plurality of stratiform members which together, when assembled, constitute a desired part such as a fugitive pattern or part replica. The stratiform members are relatively stable thick sections of the part, herein called slabs or blocks, which demand, as well as facilitate, two side (preferably opposite sides) machining, controlled by computerized three to five axis milling machines. The fabrication time for the part will be significantly reduced and the method will be particularly effective when making a complex multi-cored cast part, such as an engine head or engine cylinder block.

Figure 1:
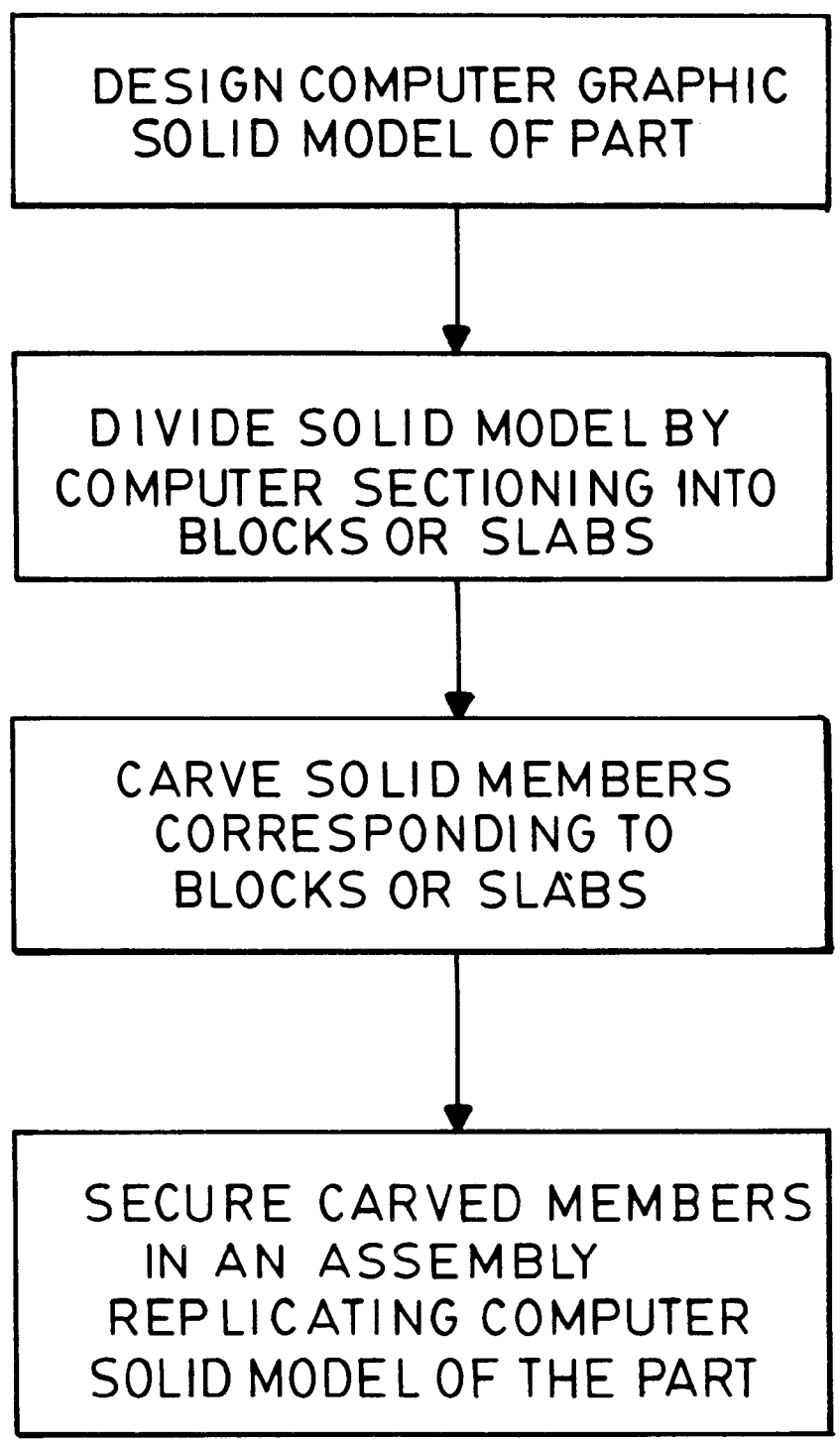
FIG. 1 is a block diagram of a process embodying the principles of this invention.

As shown in FIG. 1, the method comprises four basic steps, the first three of which are carried out within or under the control of a programmed computer. The design of the computer graphic model should be a three-dimensional CAD (computer aided design) solid model or fully surfaced model such as the single cylinder engine head shown in FIG. 2. The part or casting to be designed for which this invention is particularly adapted is one having complex free-form, undercut or substantially hidden interior surfaces.

Figure 2A:
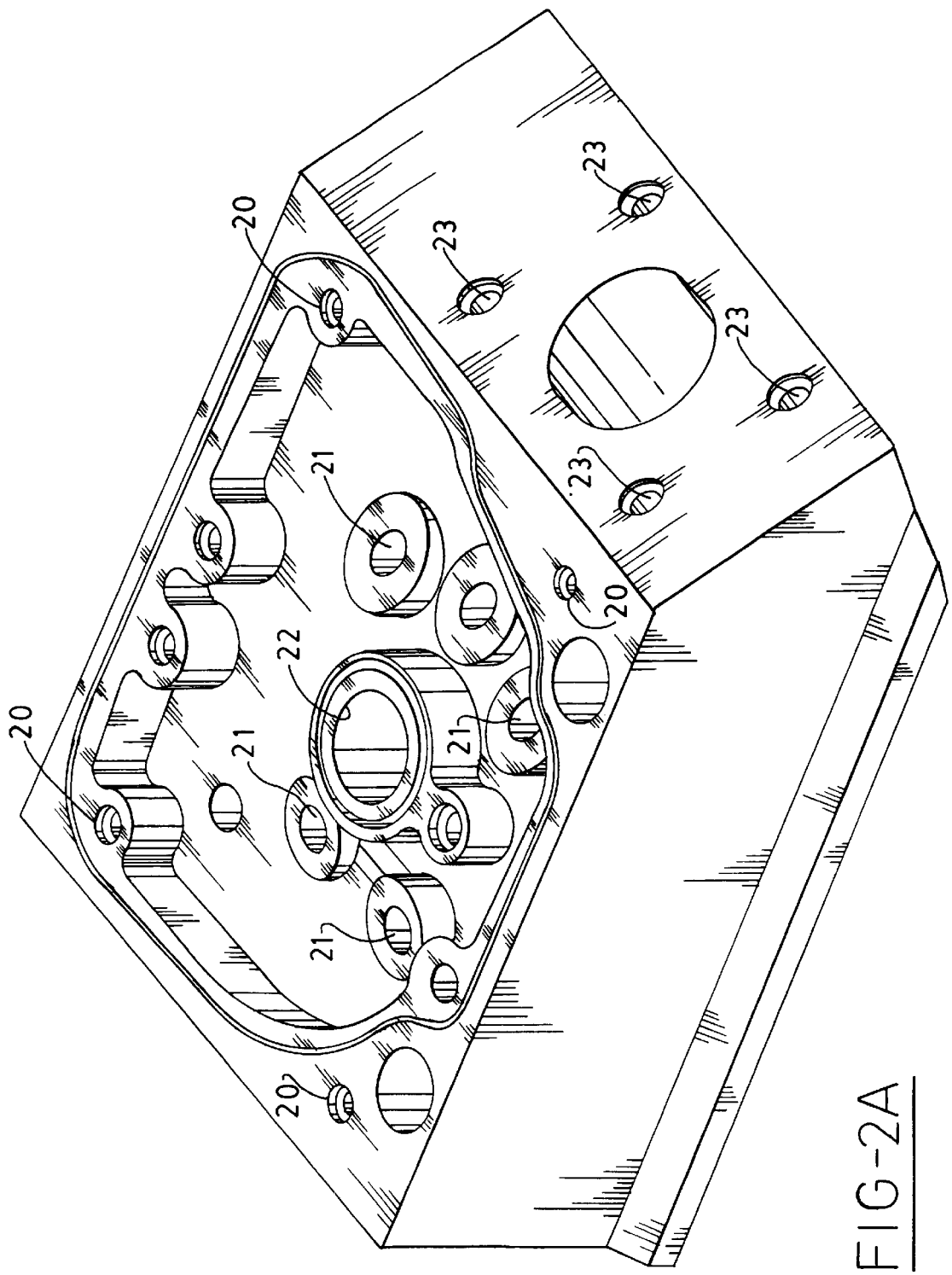
FIG. 2A is a view like 2, but showing additional design work such as bosses, locating holes and bolt holes.

Constraints must be given to the computer to control the design in certain parameters, such as solid stock size to be machined, direction of machine tool access, and the finish desired on the completed part. The design may also involve the placement of assembly or securing bolt openings which do not interrupt the internal functional cavities as shown in FIG. 2A. In this graphic the head 10 has a central combustion chamber roof 11, intake passage 14, 15, and exhaust passage 12, 13 along with a plurality of valve seats 16 for each of the passages. Several bosses are defined including spark plug or fuel injector boss 17, valve guide bosses 18 and joining bosses 19.

Figure 3A:
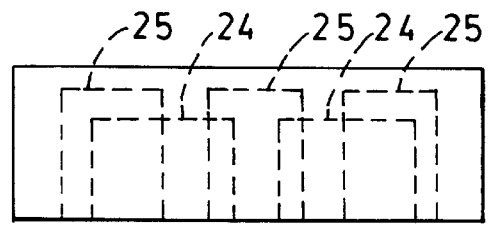
FIG. 3A is a schematic plan for taking sections or slices of the graphic model.
Figure 3B:
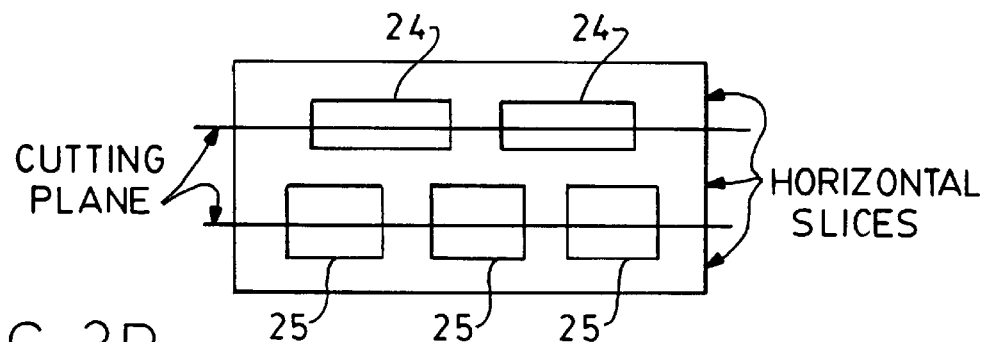
FIG. 3B is an elevational view of FIG. 3A.

It is important to plan the sectioning of the graphic model according to the block or slab concept of this invention, taking into account the location, size and shape of the internal cavities of the part to be produced. The object of sectioning or subdividing is to expose the free-form, undercut or hidden interior surfaces so they may be properly machined by three-five axis carving machine that carves into and penetrates the subdividing plane or sectioned sides of the slab or block. For example, as shown in FIGS. 3A and 3B, if the internal cavities 24, 25 are located in vertically spaced rows and if the cavities 24, 25 widely overlap in plan view, horizontal sectioning through each row of cavities is desirable to expose all of the cavities to proper access by the milling cutter. Such sectioning may be constrained by the minimal thickness that can be used to achieve a stable block or slab according to this invention. Such minimum thickness is about 14 mm for metals such as aluminum and steel. Such minimum thickness may be adjusted based upon the strength of an alternative material. Such minimum thickness and strength is necessitated by the need for at least full three axis contour machining, not merely vertical cutting as with sheet metal.

Figure 4A:
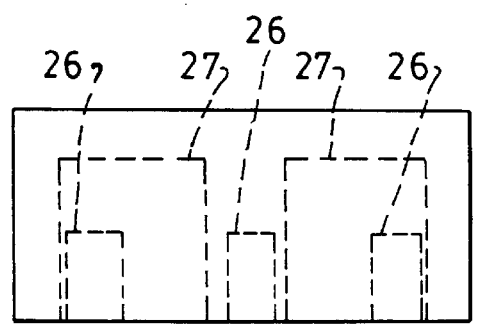
FIG. 4A is a schematic elevational view of a plan for taking a combination of both vertical and horizontal slices or sections of the computer model.
Figure 4B:
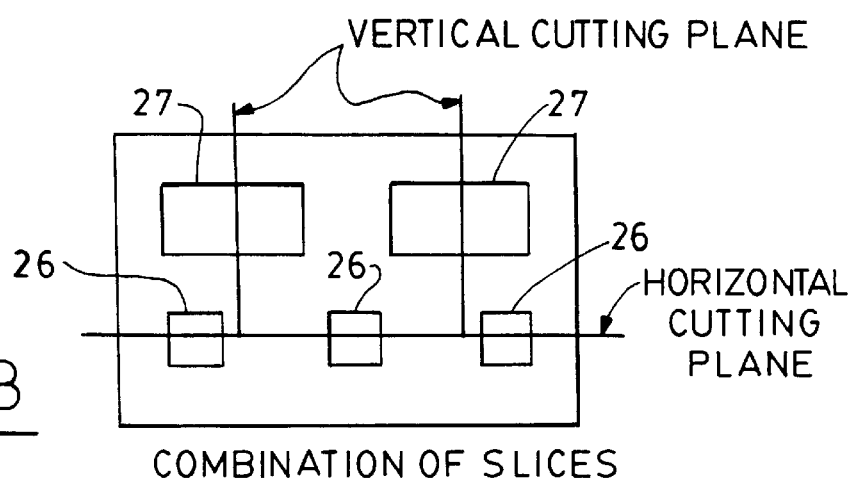
FIG. 4B is a side view of the plan shown in FIG. 4A.
Figure 5:
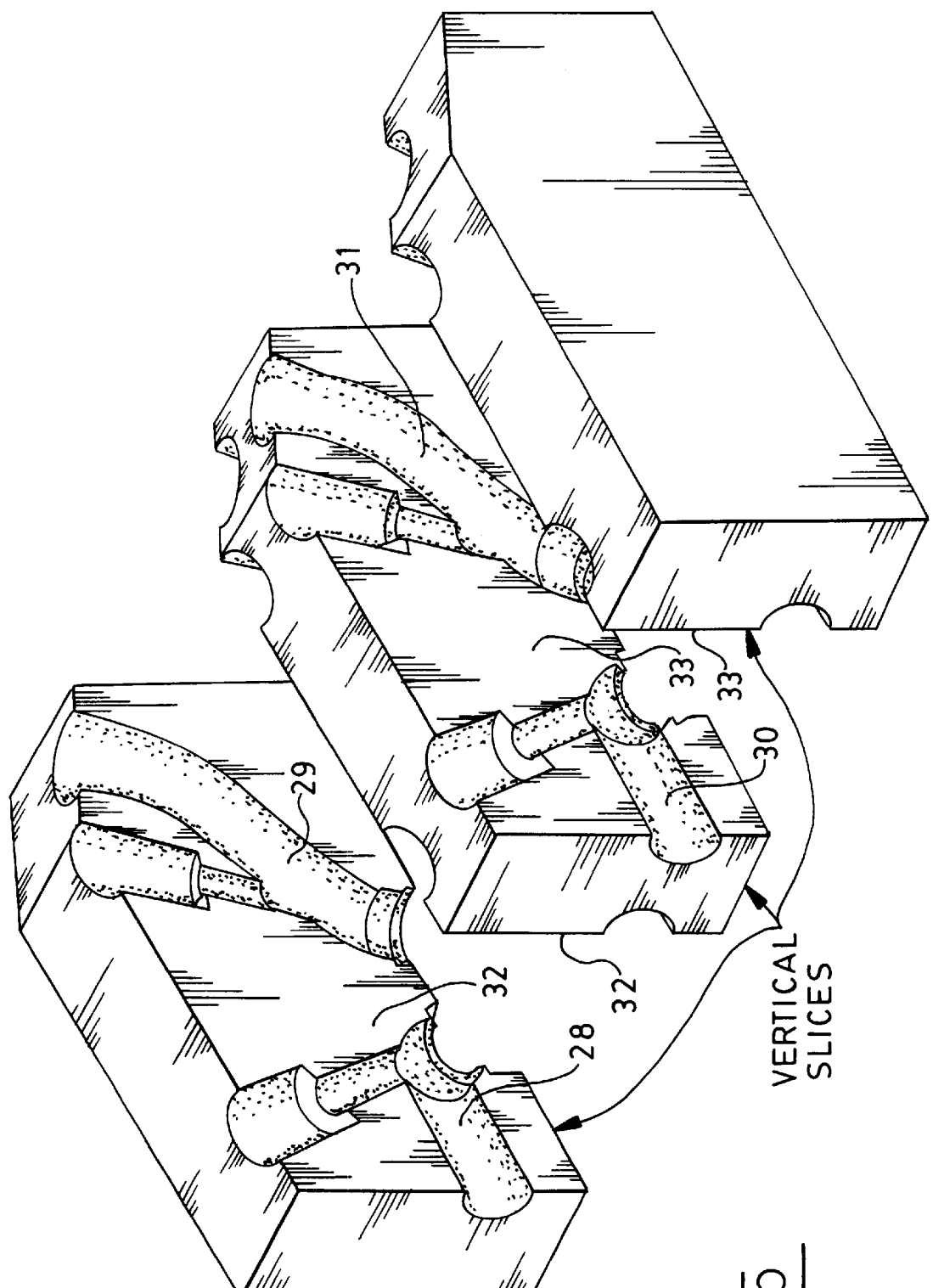
FIG. 5 is an exploded perspective view of selected computer sections of the model of FIG. 2, the sections being selected to facilitate opposite side machining.

It may be practicable, in certain cases, to combine both horizontal and vertical sectioning planes, such as shown in FIGS. 4A and 4B, where the lower series of cavities 26 are enveloped within the plan view of the upper cavities 27. Still another alternative is to utilize only vertical sectioning such as shown in FIG. 5. The ability to expose properly the internal passage 28, 29, 30 and 31 is a criteria by which this sectioning should be selected. Here such passages are generally in vertical planes 32 and 33.

The slab or block graphic members can and usually do vary in height (section interval between subdividing planes) and may also vary in the orientation of the subdividing plane. Such variation in subdivision is to (i) assure the best machining access to the particular interior surface, (ii) avoid tool vector interference (i.e. the tool shank supporting the tool tip) with the slope of adjacent carved surfaces, such as shoulders and (iii) avoid if possible the creation of islands of designed material, not attached to any other part of the graphic member. Typically, an engine head may be subdivided into five-eight blocks or slabs to properly expose the interior cavities and reap the benefits of this invention.

During the step of subdividing, it is desirable to define two or more holes that extend through each graphic member between opposite sides or subdividing planes. The holes are sized to snugly receive dowel pins that extend from a supporting fixture used during the carving step. Such pins provide a dimensional reference to assure accuracy of carving and replication of the computer model in the physical members. In the making of prototype heads, the axes for each of the holes can coincide with the axes for bolt holes which are used to receive bolts that secure the head to an engine block.

Figure 6:
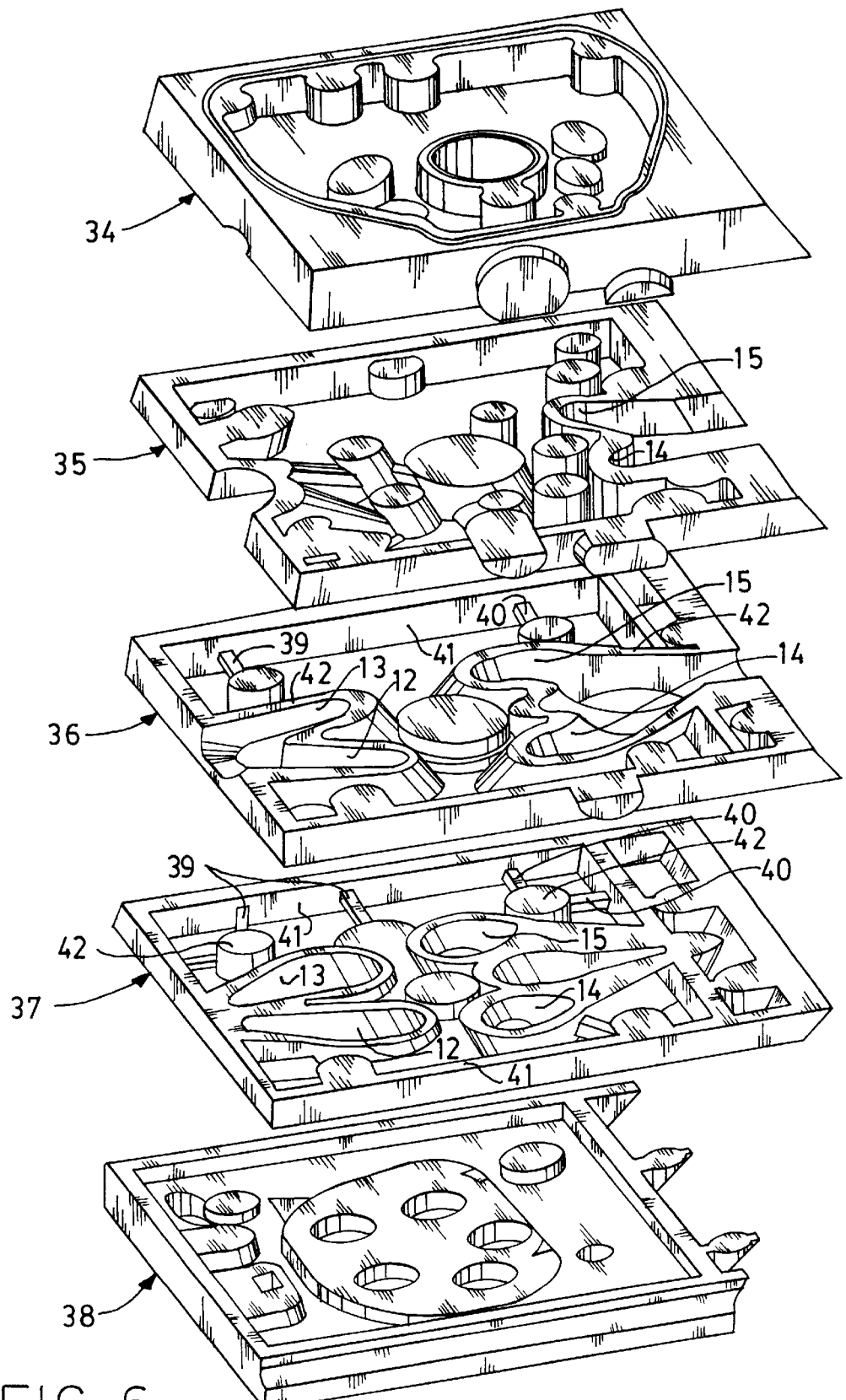
FIG. 6 is an exploded perspective view of computer sections that create slabs of the design shown in FIGS. 2A and 2B.

As shown in FIG. 6, five sections or slices of different but uniform thicknesses were determined to optimally expose the interior cavities of the single cylinder engine head model of FIG. 2. The slabs are graphic members 34, 35, 36, 37 and 38. Note the narrow thickness of slab 37, the greater thickness of slabs 35 and 36, and the still greater thickness of slabs 34 and 38. All of the slabs are of generally uniform thickness as a result of parallel horizontal sectioning. The complex contours and unusual shape of the exhaust passages 12, 13 and intake passages 14, 15 are exposed for three axis machining by the slabs 35–38, leaving no uncuttable areas or overhangs. The lack of complex contours in the top and bottom slabs 34, 38 allow such slabs to have greater thickness.

The sectioning of the computer graphic model is adapted to provide for overlap between the slices or graphic members. Such overlapping aspect is necessary to maintain continuity between surfaces. In certain slabs or graphic members, the bosses 42 defining certain cavities may be suspended and detached from the side walls 41 within that particular slab, thus necessitating the use of bridges 39, 40 such as shown for slabs 36 and 37, such bridges may later be removed if necessary or desired.

The surface quality of the machined solid members (slabs or block) is dependent on the surface requirements. The surface finish can be adapted to the material being carved so that it is better than that normally provided by present industrial standards. The solid physical members (blocks or slabs) to be machined should have a size which is generally equal to or greater than the corresponding graphic member to thereby envelope all sides of the computer graphic member.

Figure 7:
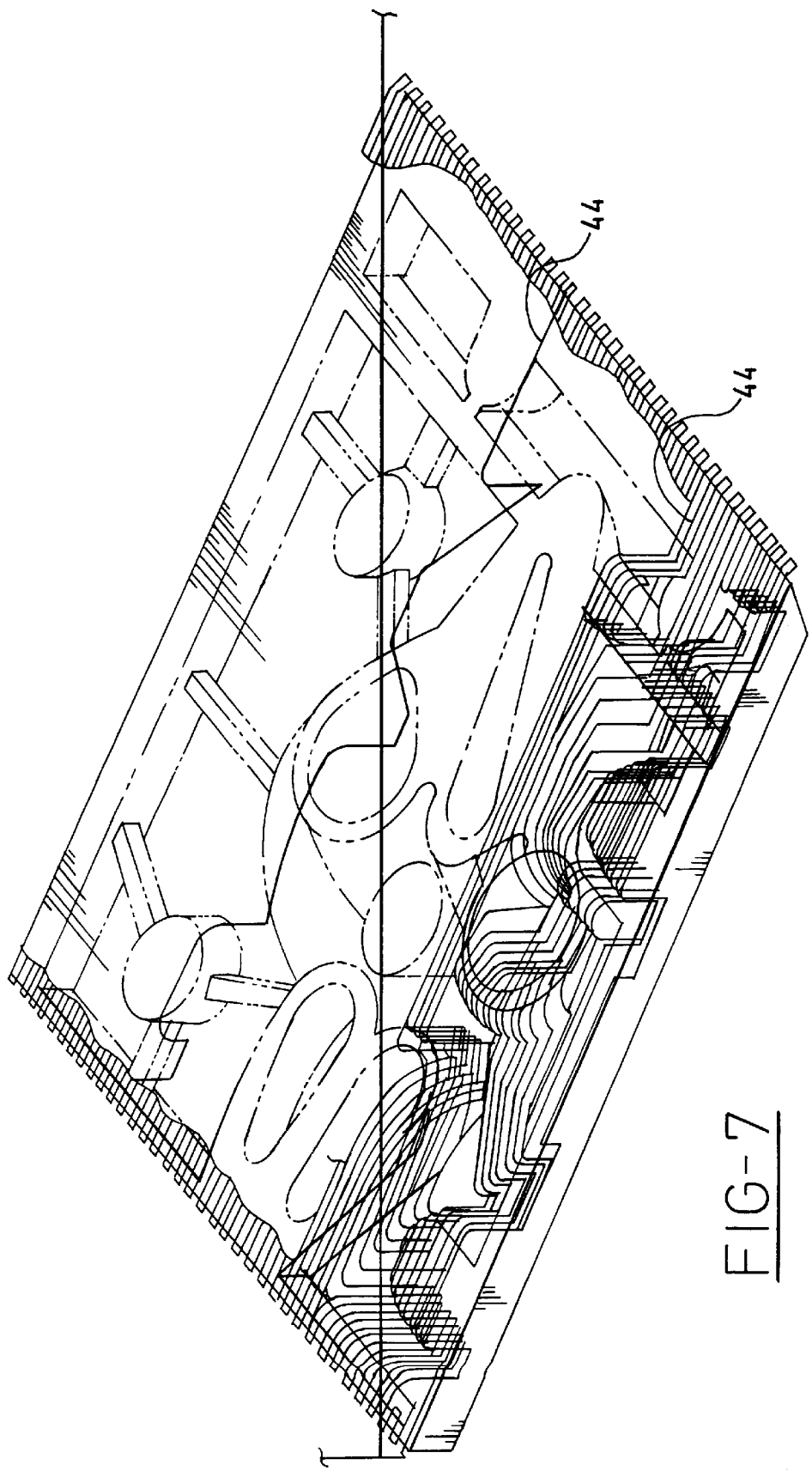
FIG. 7 is a perspective view of the computerized tool path which has been determined to carry out carving of the top side of the forth graphics member in FIG. 6 and thereby the fourth solid member.
Figure 8:
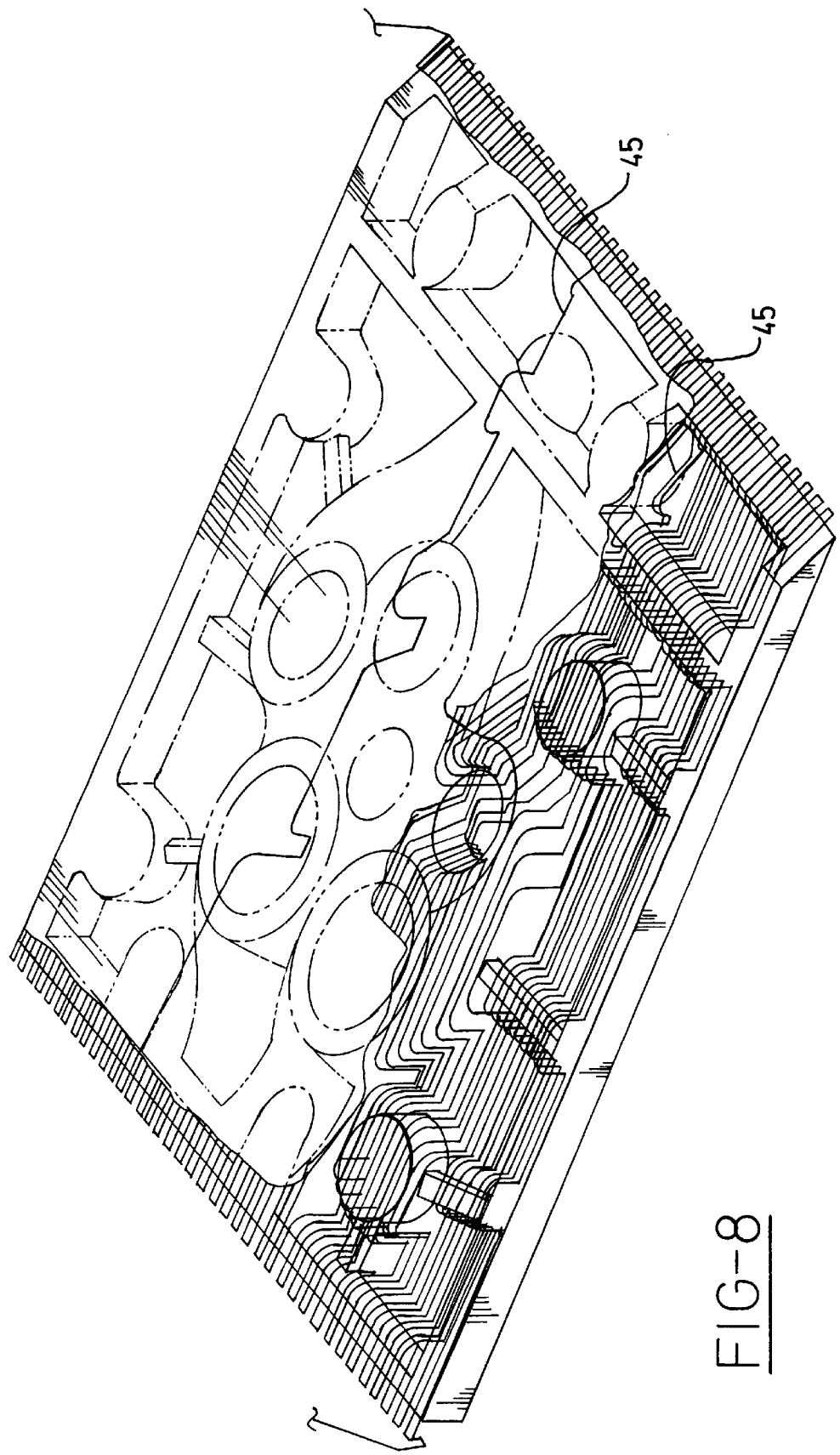
FIG. 8 is a perspective view like that in FIG. 7 but for a tool path for the bottom of the fourth graphic member in FIG. 6 and thereby the fourth solid member.

Once the solid model has been sectioned into blocks or slabs, tool carving paths must be derived by the computer program for the plurality of the exposed surfaces that are to be machined in each solid member (block or slab), preferably at the exposed top and bottom surfaces of horizontal sectioned solid members. Tool paths 44, 45 for the single cylinder engine head are shown in FIGS. 7 and 8 for member 37. Tool path 44 is for top access to the member shown in FIG. 7, and tool path 45 is for bottom access (the member turned over) to the member shown in FIG. 8. The software that is utilized to derive such tool paths is generally known as Computer Vision® /CAD/CAM, system and consists of solid modeling, numerical control, and drafting. The tool paths, once generated, within the computer, are verified by Vericut® software. It should be noted from reviewing FIGS. 7 and 8 that several return passes of the tool are needed to carve out carving; the interior material that is removed is not cut as a segment to fall away.

Tool path generation may involve first selecting machining phases for each graphic member to achieve enhanced carving productivity, carving quality and tool life; the carving paths for the phases are not necessarily the same, but are customized for the amount of material to be removed. The phases may include: (i) profiling (where the subdividing planes are defined and where reference holes are drilled, (ii) rough machining, (iii) pre-finish machining and (iv) final finishing. The tool paths are adjusted to work with three or five axis machine capacity. Profiling and rough machining are carried out at a faster material removal rate than the finishing phases. Next, the tool characteristics are selected for each phase and carving path, which selection may comprise: (a) tool shape determined by the desired type of machining, (b) tool diameter determined by the minimum radius of the surface to be carved, (c) tool length determined by the thickness of the slab or block, (d) the number of tool flutes determined by the desired finish, and (e) tool rake angle as determined by the nature of the material for the physical member being carved. Several tools thus may be used to machine each slab or block. It is desirable to overlap the tool paths for adjacent graphic members to assure accurate and smooth contouring of mating interior surfaces of carved solid members when assembled as a unit.

Figure 9:
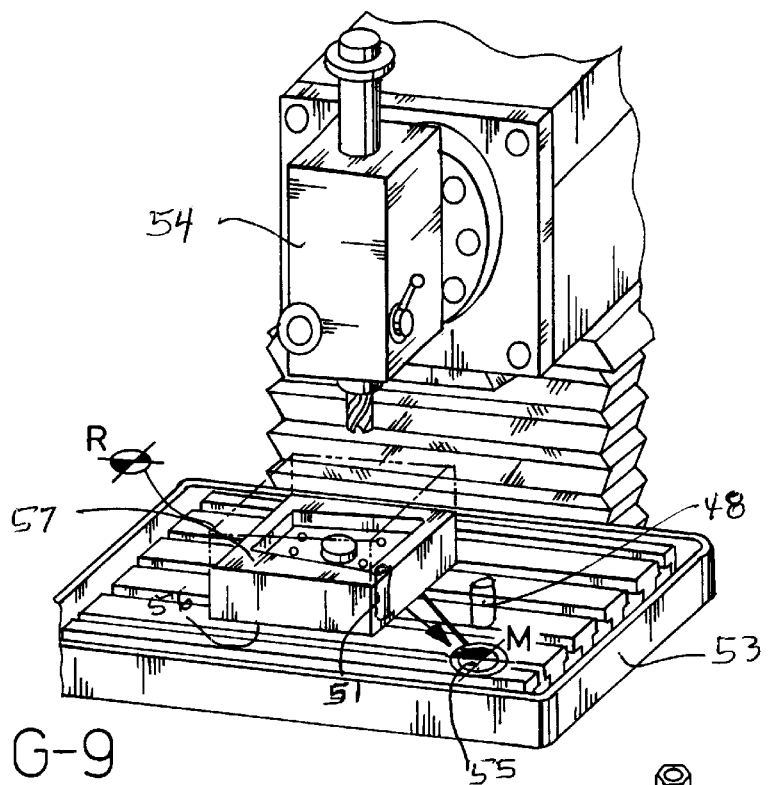
FIG. 9 is a perspective schematic view of a typical three-axis milling machine tool as applied to the carving of the top side of a solid member.

In carrying out the third step of the basis process, CNC milling is utilized to carve the various internal cavities and surfaces of each physical solid member (slab or block) while the solid member is rigidly fixed to the milling machine. Carving is carried out in phases as directed by the CNC program determined earlier in the tool path generation step. The fugitive material block or slab may be profiled (reference holes are drilled and face milling is carried out along the subdividing planes), then the interior surfaces are rough machined, semi-finished and finally finished machined. Five axis carving permits thicker slabs or blocks to be used while achieving equivalent or more accurate contouring. It is desirable to drill locating openings for locator or alignment pins to facilitate holding or fixturing the solid member during subsequent machining, as shown in FIG. 9. The locator openings and joining openings will also determine the exact reassembly of the solid members (slabs and blocks) as a unit. The bolt holes (that may be utilized to secure the assembly in some cases) should be drilled with precise accuracy. A fixture plate or deck 53 is dimensionally referenced to the carving machine 54; the deck is provided with at least one tapped hole 55 (preferably two or more) for snugly seating removable dowel pins 48 which will upstand from the deck hole and offer alignment to the holes 51 in the slab or block undergoing machining. Each slab or block undergoing machining is layed with one side 56 on the fixture deck with its reference holes receiving the dowel pins 48; the slab or block is machined in such first position by carving into side 57. The slab or block is then flipped over, aligned with the dowel pins and side 56 machined, without changing the home location of the deck. Due to the overlap of carving paths between graphic members, the contours of mating slabs or blocks is perfect and smooth. It is important that the milling machine be able to remove material in the X, Y and Z axes to create a duplicate of the graphic model. An example of a CNC milling machine that may be utilized for purposes of carrying out this step of the process is shown in FIG. 9. Although only three axis milling is needed, the method can utilize four or five axis milling also, but may not be necessary.

Figure 10:
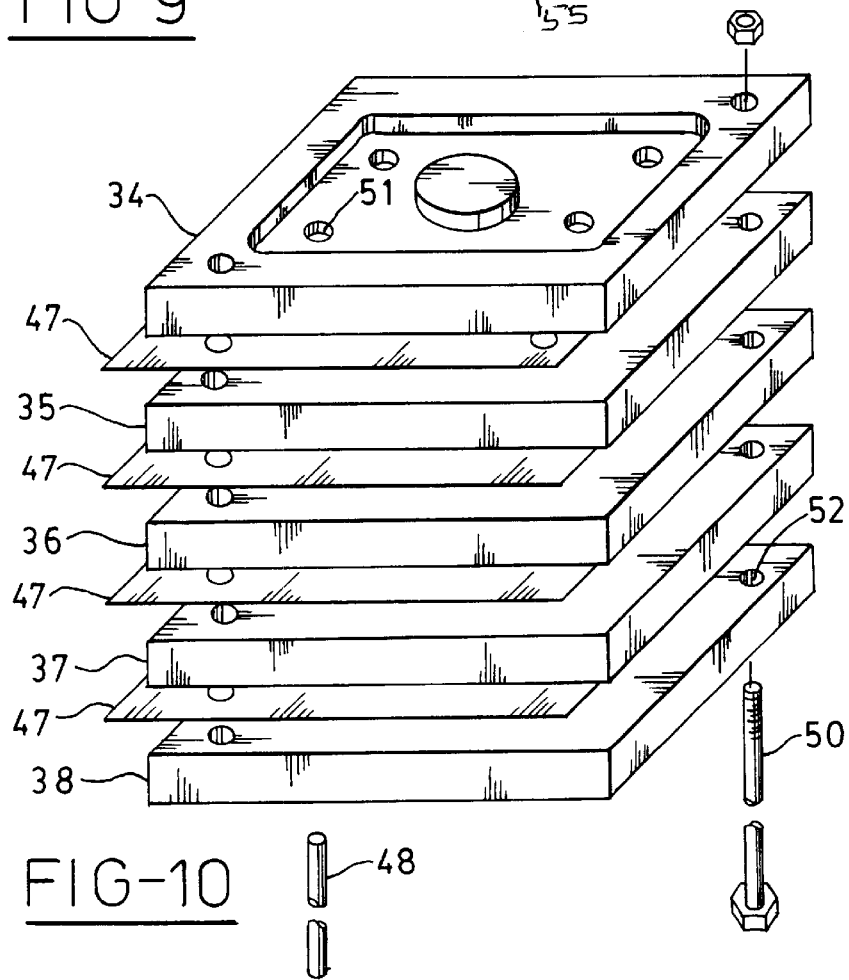
FIG. 10 is an exploded view of the solid members after machining, and as assembled together with brazing sheets therebetween.

In the final step of the pattern making process, the individual physical slabs or blocks are assembled together and secured such as by adhesive or requiring some form of substance action. In the example of the single cylinder engine head, the slabs are assembled together with adhesive 47 superimposed between members 34–38 as shown in FIG. 10; locating pins 48 are introduced to precisely align openings 51 to bring the solid members (slabs) together in the exact location needed to duplicate the graphic model. It is desirable that securing, such as by adhesives, be made impervious to sand or fluids at the mating interfaces. Additionally, bolts or fasteners 50 may be employed through openings 52 to clamp the assembly together during handling.

The method of this invention reduces the overall time period for producing a fugitive pattern by as much as 30%. The single cylinder head disclosed in the above description can be designed and a pattern produced in less than 3–4 weeks. The process eliminates waste, reduces the number of steps and personnel needed to perform, and permits use of a variety of materials, all leading to cost reduction.

The resulting fugitive pattern of this method comprises: a stack of physically solid members (i.e. blocks or slabs of wax or polystyrene foam) secured together in sequence to replicate the three-dimensional computer graphic model of the part, the physically solid members (blocks or slabs) being prepared by the steps of (i) sectioning a graphic model into graphic members which are blocks and/or slabs, and (ii) carving a non-graphic solid member (block or slab) for each of the graphic model members by accessing and free-form carving into two or more sectioned sides of the solid members (see FIGS. 6–8) to essentially duplicate the corresponding graphic section members. Such pattern will possess valuable unique characteristics which comprise structural stability, an outer contoured smooth surface that is not interrupted or stepped from solid member to solid member (block-block or slab-slab), the surface finish and strength of the product being at least as good as that conventionally produced. For the solid members utilized in the basic method, metal is selected as normally required by the functional part. The sectioning must accommodate the condition of the solid member when reduced to stratiforms, while providing access to the designed internal cavities. The product eliminates stack-up errors characteristic of object sectioning using very thin laminations.

Figure 11:
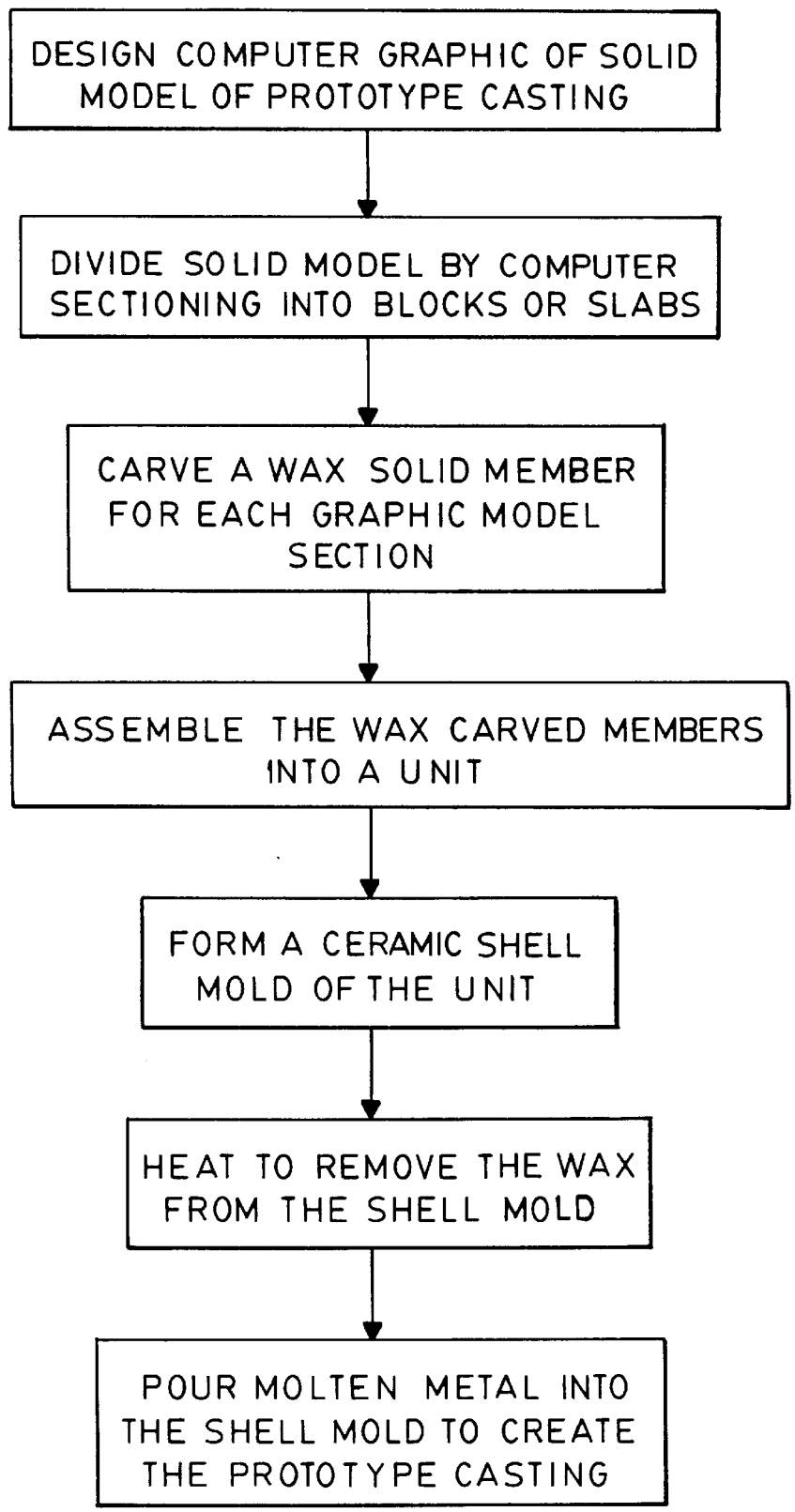
FIG. 11 is a schematic flow diagram depicting how the method of this invention can be applied to the fast prototyping of cast components.

As shown in FIG. 11, the process can be first modified to rapidly produce functional cast (metal or synthetic) parts in prototype quantities at greatly reduced cost and time. Prototype characteristics means low volume, temporary tooling, temporary life and manual handling. Thus, the basic method would be used to create a nonfunctional part or tooling which then in turn is used to produce a functional cast part. This first method of making a casting requires modifying step 3 by using wax for the solid members to be carved. The wax solid members are carved, assembled into a unit to define an investment pattern to which a wax gating system of stock items is added. The pattern is coated with a ceramic shell to create a mold. The wax investment pattern is dipped and coated with ceramic slurry to form a surrounding shell which can function as a mold. The mold is preferably formed by dipping the pattern into a slurry consisting of ceramic flour in colloidal silica and then sprinkling it with a fine sand. After drying, the mold is dipped into another ceramic slurry, then into a fluidized bed containing granular molochite thus stuccoing the surface again. The wax is removed by heat leaving the desired casting cavity, which is then filled with molten metal to form the prototype cast object precisely duplicating the computer graphic model.

The investment wax pattern may be removed either by shock-firing or steam autoclaving. When metal is poured into the mold cavity to produce the required cast object, a precise and accurate casting is produced. Such method of producing casting provides superior and accurate surface quality when compared to other rapid prototyping techniques. The tool paths developed are closer to the production tool level and the sectioning of the computer model for a wax pattern can follow true parting lines needed for casting purposes. The process allows reduced fabrication time, thus giving greater lead time in designing new parts for automobiles and thereby earlier evaluation of competing designs.

Figure 12:
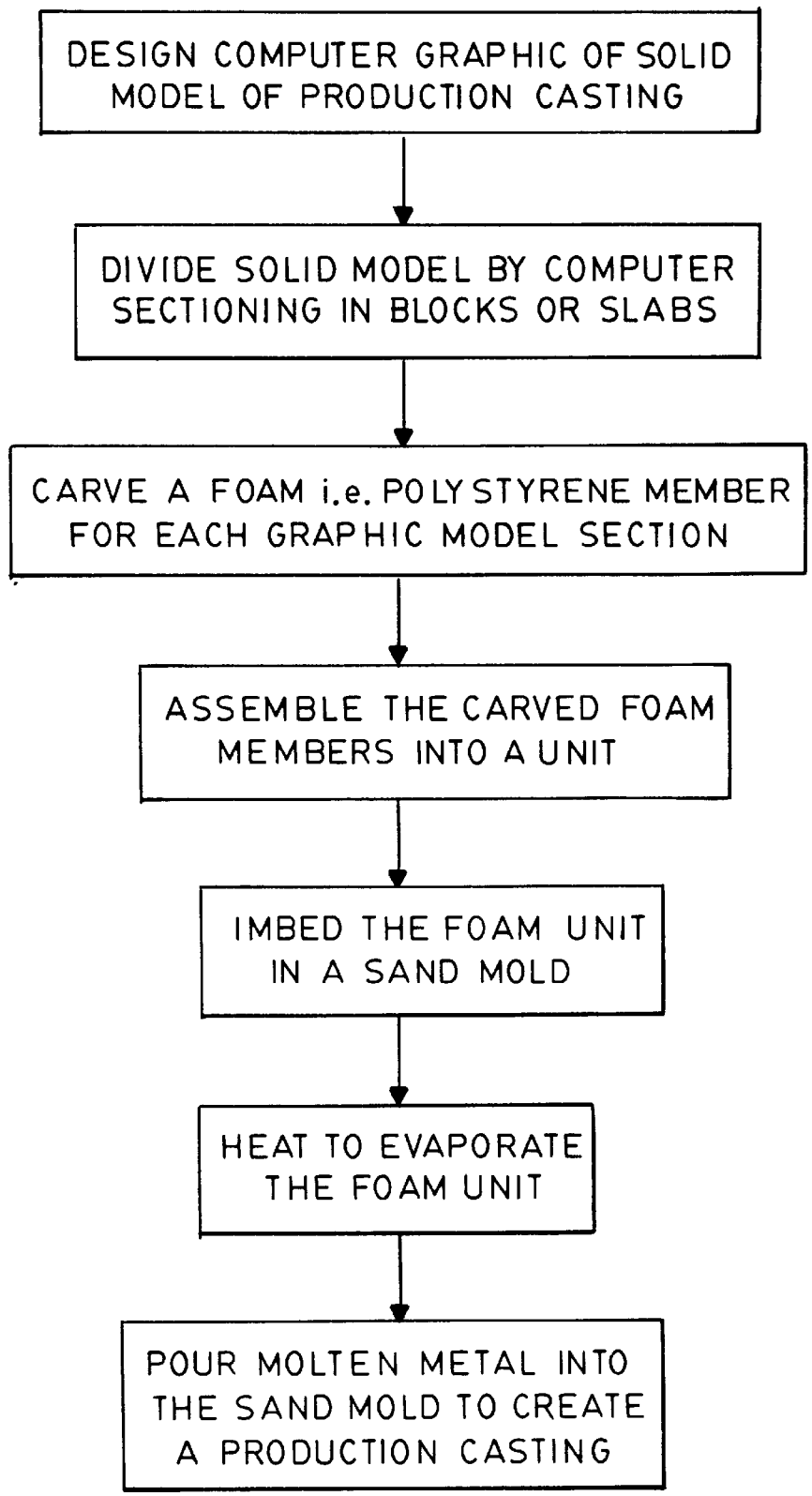
FIG. 12 is a schematic flow diagram of how the method of this invention can be applied to the rapid making of initial pre-production cast components.

As a still further modification of the basic process, rapid pre-production casting can be economically produced, for example, in quantities of 100 or less. Production characteristics means high volume, long life, tool steel materials, and automated handling methods. As shown in FIG. 12, such second alternative method involves carving of physically solid foam blocks or slabs, (comprised of polystyrene) by CNC milling machines which are guided by the computer graphic model. The computer model is subdivided (sectioned) into the physically solid members (blocks and slabs) for carrying out the machining of the internal cavities of the part. The physically solid foam members, after machining, are assembled together in a unit and secured together such as by microwave adhesion or by introducing a fluid adhesive to the mating surfaces of the solid foam members. The assembled unit of foam (blocks or slabs) becomes an investment pattern (to which is adhered a foam gating system comprised of stock items of tubes and runners) and is then given a refractory coating and dried. The unitized foam members are inserted into a open chamber into which fluidized dry sand is introduced to surround and fill the foam investment pattern; the pattern assembly will also contain suitable foam gating members (such as from stock foam parts) which are also embedded in the unbonded sand. Molten metal is poured into the gating members and thence to the foam pattern to displace and vaporize the foam, allowing gaseous emissions to migrate into and through the unbonded dry compacted sand mold (acetone may also be used to remove the foam before pouring). The resulting casting will contain a precise definition of the computer designed production casting. This method modification is particularly valuable to produce limited pre-production castings.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of making a casting having free-form, undercut or hidden interior surfaces, comprising:

(a) designing a three-dimensional computer graphic model of said casting;

(b) computer sectioning the graphic model into graphic members which are at least one of blocks and slabs having sides normal to the sectioning interval;

(c) carving a physically solid member for each of the graphic members, the solid members being (i) constituted of an easily meltable, dissolvable or evaporative solid material, (ii) proportional to and enveloping its corresponding graphic member, and said carving being carried out by accessing and carving into and through two or more of said sides of each solid member that possesses at least portions of said interior surfaces and thereby essentially duplicate the corresponding graphic member;

(d) securing the carved solid members together with matching interior surfaces to replicate the graphic model and form a unitary investment pattern;

(e) forming a mold around said pattern, and (f) casting metal within said mold while removing the pattern from such mold either by evaporation during pouring of the molten metal thereinto or by melting or dissolution prior thereto.

2. A method of making a casting having complex free-form, undercut or substantially hidden interior surfaces, comprising:

(a) designing a three-dimensionally fully surfaced computer graphic model of said casting including said interior surfaces;

(b) within a computer, sub-dividing the graphic model into graphic members selected from blocks and slabs;

(c) carving a solid non-graphic physical member to replicate each of the graphic members, said physical members being constituted of a meltable or evaporative solid material and each being shaped proportional to and enveloping the respective graphic members, said carving being carried out to at least access, carve into and penetrate two or more sides of each solid physical member that possesses at least portions of said interior surfaces and thereby to permit such carving to essentially duplicate the corresponding graphic member;

(d) securing together the carved solid physical members with matching interior surfaces to replicate the graphic model and form a unitary investment pattern;

(e) forming a mold around said pattern; and (f) casting material within said mold while removing the pattern from such mold either by evaporation during casting of the material thereinto or by melting or dissolution prior thereto.

3. The method as in claim 2 in which, after step (b), computer controlled carving paths for each subdivided graphic member are generated that access said complex, free-form, undercut, or substantially hidden interior surfaces.

4. The method as in claim 3 in which the carving paths for one graphic member overlaps the carving paths for an adjacent mating graphic member.

5. The method as in claim 3 in which said carving paths are selected so that a multiple axis carving machine, having three or more axes of articulation, can reach all of said interior surfaces for each slab or block without tool vector interference of any of the interior surfaces of the physical member being carved.

6. A method of making a fugitive investment pattern having free-form, undercut or hidden interior surfaces, comprising:

(a) designing a three-dimensional computer graphic model of said casting;

(b) computer sectioning the graphic model into graphic member which are at least one of blocks and slabs having sides normal to the sectioning interval;

(c) carving a physically solid member for each of the graphic members the solid members being (i) constituted of an easily meltable, dissolvable or evaporative solid material, (ii) proportional to and enveloping its corresponding graphic member, and said carving being carried out by accessing and carving into and through two or more of said sides of each solid member that possesses at least portions of said interior surfaces and thereby essentially duplicate the corresponding graphic member; and (d) securing the carved solid members together with matching interior surfaces to replicate the graphic model and form a unitary fugitive investment pattern.

* * * * *